(12) United States Patent
Shin

(10) Patent No.: US 8,034,474 B2
(45) Date of Patent: Oct. 11, 2011

(54) BATTERY PACK WITH NONDIRECTIONAL TERMINAL

(75) Inventor: Heung-Sik Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1106 days.

(21) Appl. No.: 11/831,633

(22) Filed: Jul. 31, 2007

(65) Prior Publication Data

US 2008/0032187 A1 Feb. 7, 2008

(30) Foreign Application Priority Data

Jul. 31, 2006 (KR) ........................ 10-2006-0071928

(51) Int. Cl.
*H01M 2/06* (2006.01)
*H01M 2/30* (2006.01)

(52) U.S. Cl. ........................................ 429/122; 429/123

(58) Field of Classification Search ........................ None
See application file for complete search history.

(56) References Cited

FOREIGN PATENT DOCUMENTS

| KR | 1020060020758 | 3/2006 |
|---|---|---|
| KR | 1020060098672 | 9/2006 |

*Primary Examiner* — Barbara Gilliam
*Assistant Examiner* — Maria J Laios
(74) *Attorney, Agent, or Firm* — The Farrell Law Firm, P.C.

(57) ABSTRACT

Provided is a battery pack with a nondirectional terminal, which includes a terminal part electrically connected to a connector part provided on a battery pack mounting surface of a body of an electronic device. The terminal part includes a plurality of individual terminals that are respectively connected to individual connectors of the connector part and are symmetrically installed to constantly and smoothly supply power even if the battery pack is reversely mounted in the electronic device.

16 Claims, 4 Drawing Sheets

BATTERY PACK WITH NONDIRECTIONAL TERMINAL

PRIORITY

This application claims priority under 35 U.S.C. §119(a) to a Korean Patent application filed in the Korean Intellectual Property Office on Jul. 31, 2006 and assigned Serial No. 2006-71928, the contents of which are incorporated herein by reference.

BACKGROUND OF THE INVENTION

1. Field of the Invention

The present invention relates generally to a battery pack which is a power supply unit used in various types of electronic products, and in particular, to a battery pack with a nondirectional terminal constituted so as to smoothly supply power regardless of a mounting direction.

2. Description of the Related Art

In general, various types of electronic products including portable devices use battery packs, which are attachable to and/or detachable from the electronic products, as power supply units. Such a battery pack is constituted so as to be charged with electricity and thus reusable. A terminal is provided on a widest surface or narrowest side of the battery pack according to a shape of an electronic product or an attached and detached position of the battery pack. In the former case, the battery pack can be used in a portable terminal, a camcorder, etc. In the latter case, the battery pack can be used in a slim product such a digital camera, etc.

In order to constitute the battery pack, a battery cell and a charging circuit, etc. are built in upper and lower case frames formed of synthetic resin. Finally, the upper and lower case frames are fixed to each other using a process such as reciprocal supersonic fusion. The terminal is installed to expose a portion thereof outside the fused case frame so as to be connected to a connector terminal, which normally protrudes from a battery pack mounting portion of the electronic product.

The terminal of the battery pack has at least three individual terminals including a positive terminal, a negative terminal, and a ground terminal. The at least three individual terminals must be insulated from one other and are respectively connected to individual connectors of the connector terminal provided at the battery pack mounting portion of the electronic device.

However, the terminal of the battery pack is exposed from a specific portion of an outer surface of the battery pack. Thus, the battery pack must always be installed in a predetermined direction in the electronic product. As a result, users must find out in which directions battery packs having rectangular shapes are to be mounted in electronic products, in order to mount the battery packs in the electronic products.

SUMMARY OF THE INVENTION

An aspect of the present invention is to substantially solve at least the above problems and/or disadvantages and to provide at least the advantages below. Accordingly, an aspect of the present invention is to provide a battery pack with a nondirectional terminal constituted so as to supply power to an electronic product even if the battery pack is mounted in any direction.

Another aspect of the present invention is to provide a battery pack with a nondirectional terminal constituted so as to smoothly supply power regardless of a mount direction so as to increase convenience for a user.

According to one aspect of the present invention, there is provided a battery pack with a nondirectional terminal, which includes a terminal part electrically connected to a connector part provided on a battery pack mount surface of a body of an electronic device, wherein the terminal part includes a plurality of individual terminals which are respectively connected to individual connectors of the connector part and are symmetrically installed to constantly and smoothly supply power even if the battery pack is reversely mounted in the electronic device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a portable terminal including a cell type battery pack but is not limited to this. The cell type battery pack may be applied to various types of electronic devices to which charge type battery packs attachable to bodies are applied.

Figure 1:
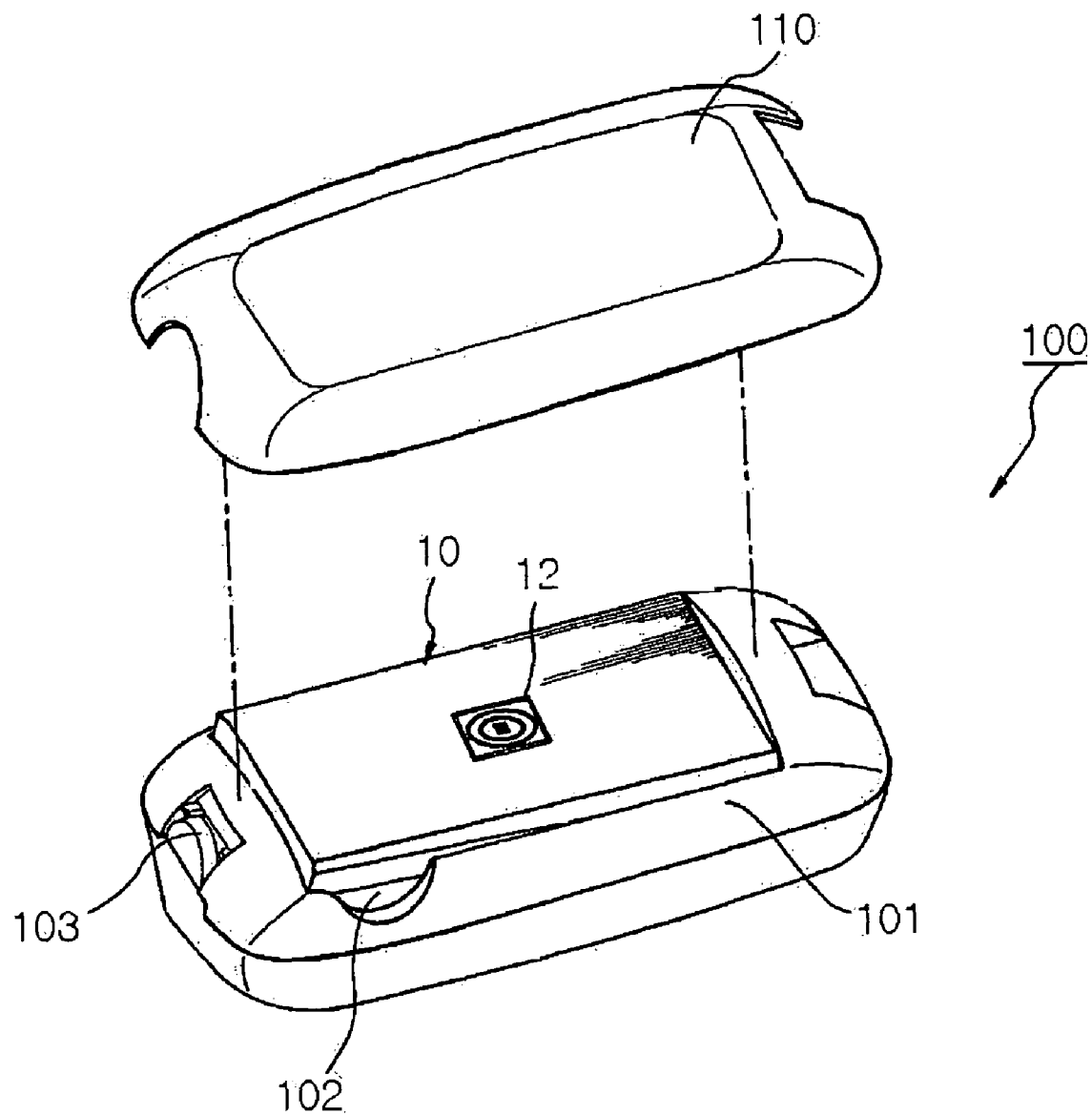
FIG. 1 is a perspective view illustrating a back surface of a portable terminal in which a battery pack is mounted according to the present invention.

FIG. 1 is a perspective view illustrating a back surface of a portable terminal 100 in which a battery pack is mounted according to the present invention.

Referring to FIG. 1, a cell type battery pack 10 is mounted on a back surface 101 of the portable terminal 100. A battery pack mounting portion 102 is formed in the back surface 101 of the portable terminal 100. The cell type battery pack 10 is mounted in the battery pack mounting portion 102 and then is covered with a cover 110 so as to be protected. A locker 103 is formed in the back surface 101 of the portable terminal 100 to lock and unlock the cover 110.

Terminal parts 11 (not shown) and 12 are respectively installed on a widest surface of the cell type battery pack 10 and a back surface opposite to the widest surface. In other words, the terminal parts 11 and 12 are respectively installed on two surfaces to smoothly supply power even if the cell type battery pack 10 is reversely mounted.

Figure 2:
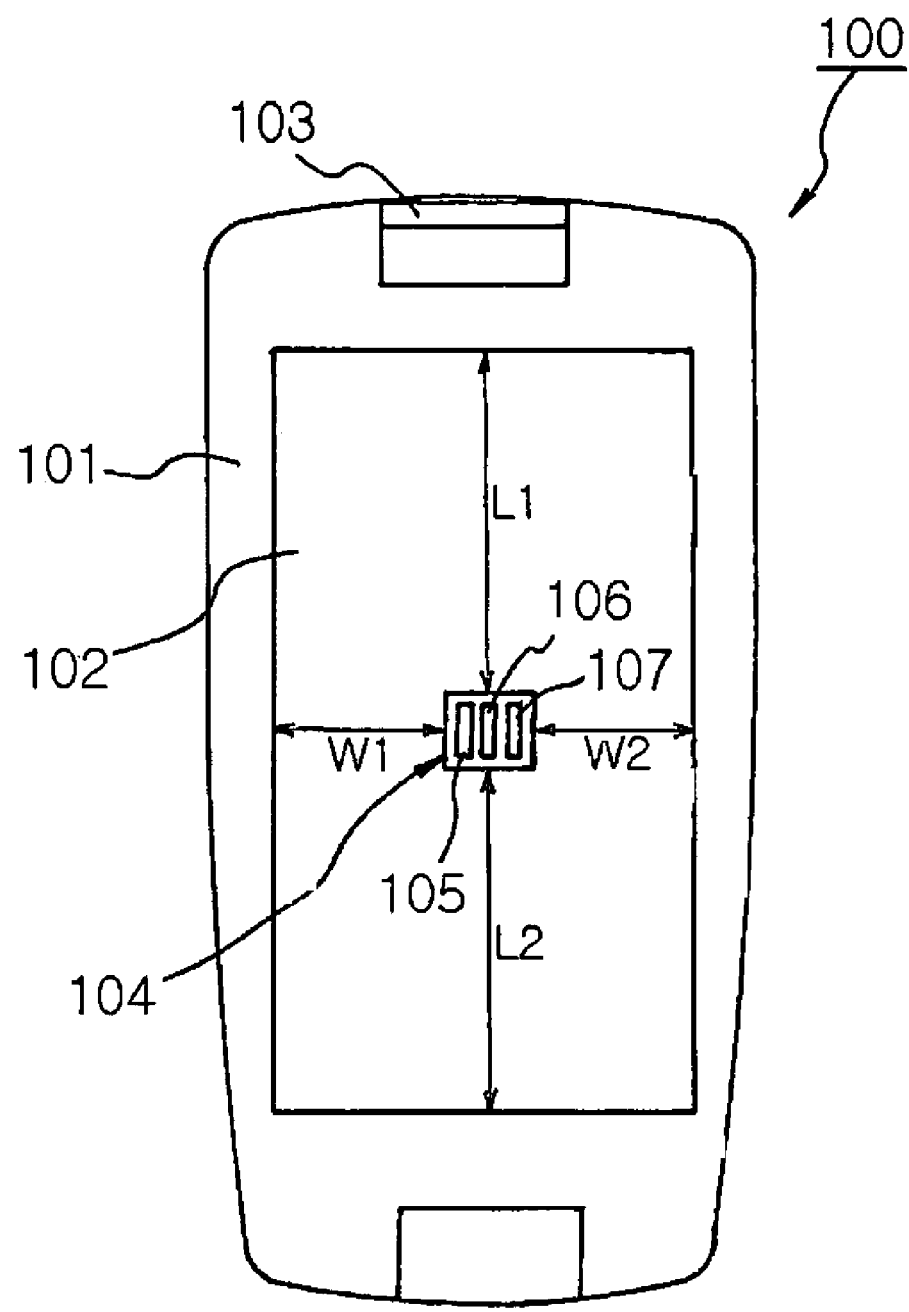
FIG. 2 is a plan view illustrating the back surface of the portable terminal in which the battery pack is mounted.

FIG. 2 is a plan view illustrating the back surface 101 of the portable terminal 100 in which the cell type battery pack 10 is mounted.

Figure 5:
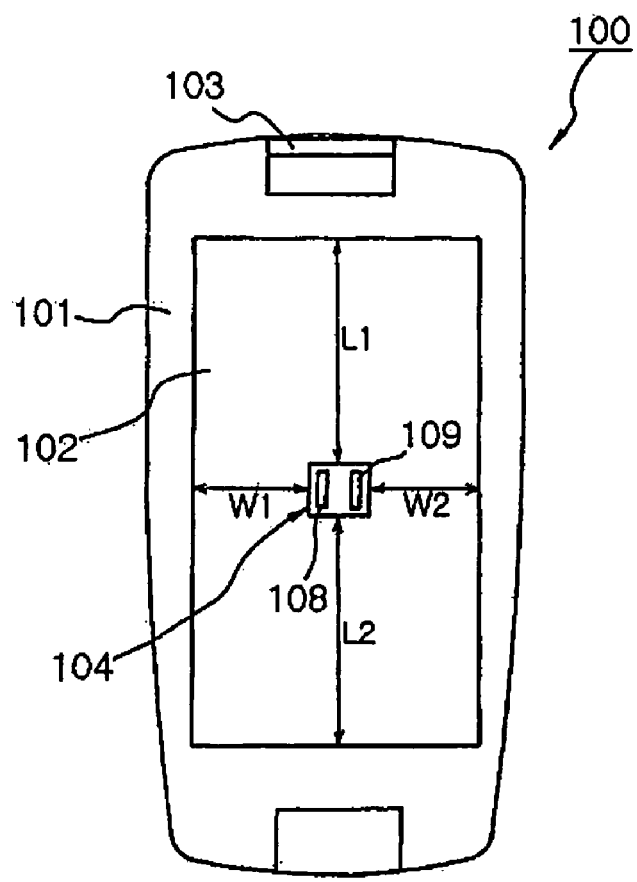
FIG. 5 is a plan view illustrating a back surface of another portable terminal in which a battery pack is mounted according to the present invention.

Referring to FIG. 2, the battery mounting portion 102 is formed in the back surface 101 of the portable terminal 100. In this case, a connector part 104 is provided at the battery pack mount portioning 102 and includes three individual connectors, i.e., a positive connector 105, a negative connector 106, and a ground connector 107. However, the connector part 104 is not limited to this and may include only a positive connector and a negative connector as shown in FIG. 5.

The connector part 104 may be disposed in the center of the battery pack mounting portion 102. In other words, the connector part 104 may be disposed at an intersection between lengthwise and widthwise directions of the portable terminal 100. Here, lengths L1 and L2 are equal in the lengthwise direction, and widths W1 and W2 are equal in the widthwise direction. This is because the terminal parts 11 and 12, having the same shape, are respectively formed on opposite surfaces of the cell type battery pack 10. In other words, this is to smoothly electrically connect the terminal part 12 to the connector part 104 even if the cell type battery pack 10 is mounted in a reversed or a rotated state.

Figure 3:
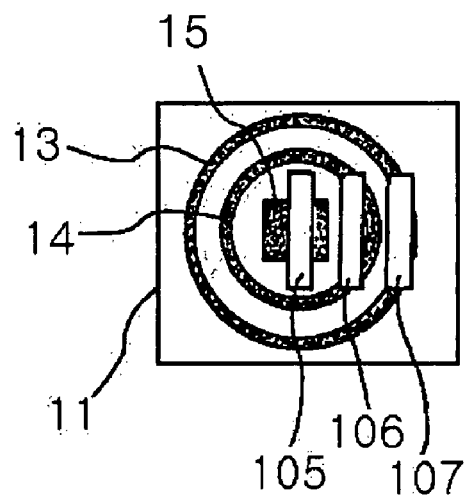
FIG. 3 illustrates a connection state between a terminal part of the battery pack and a connector part of the portable terminal.

FIG. 3 illustrates a connection state between the terminal part 11 of the cell type battery pack 10 and the connector part 104 of the portable terminal 100. Here, only a shape of the terminal part 11 of the battery pack 10 is shown. The terminal part 11 includes three individual terminals 13, 14 and 15, which have concentric circles and different sizes. Thus, the three individual terminals 13, 14 and 15 are substantially symmetrical with respect to the center. This structure is to electrically connect the positive connector 105, the negative connector 106, and the ground 107 to the three individual terminals 13, and 14 and 15, respectively, even if the cell type battery pack 10 is rotated or reversed and thus inaccurately mounted. Therefore, the positive connector 105, the negative connector 106, and the ground connector 107 of the connector part 104 may be electrically connected to the three individual terminals 13, 14 and 15 of the cell type battery pack 10, respectively, as shown in FIG. 3.

Figure 4:
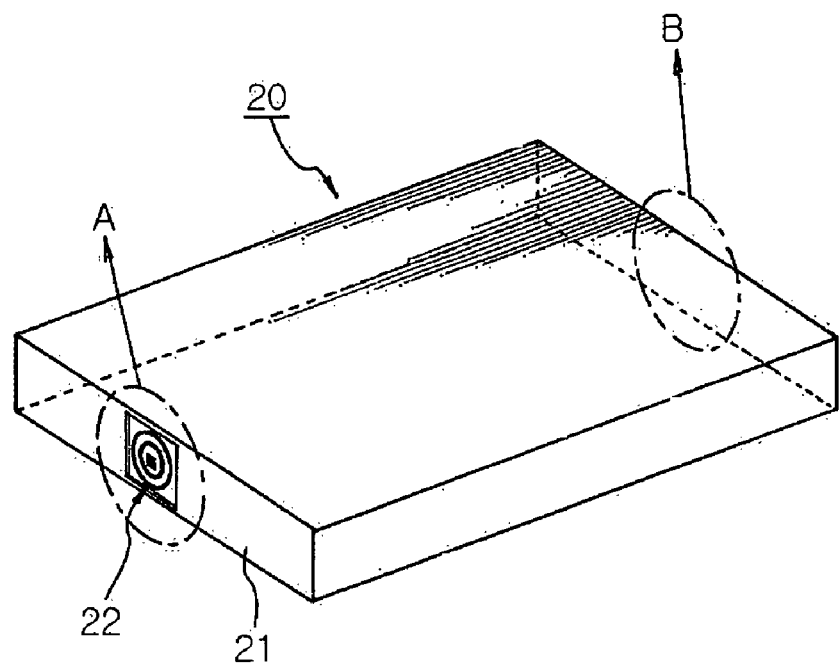
FIG. 4 is a perspective view of a battery pack with terminals according to another embodiment of the present invention.

FIG. 4 is a perspective view of a battery pack 20 with terminals according to another embodiment of the present invention.

Referring to FIG. 4, a terminal part 22 is installed on a narrowest side 21 of the battery pack 20, i.e., portion A. This structure may be advantageous to be mounted in some types of portable terminals, digital cameras, or the like. As described in the previous embodiment, the terminal part 22 may include a plurality of individual terminals that have concentric circles and different sizes. A terminal part may be further installed on portion B opposite to the narrowest side 21 on which the terminal part 22 is installed, in order to smoothly operate the battery pack 20 even when the battery pack 20 is inaccurately mounted.

Figure 6:
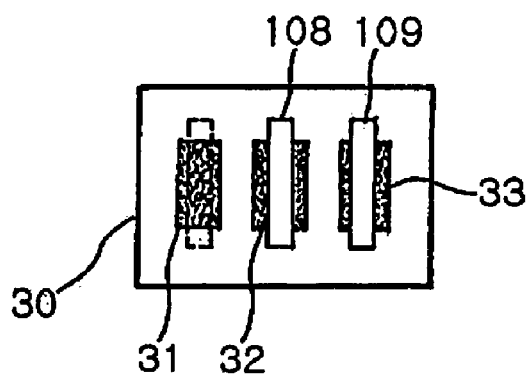
FIG. 6 illustrates a connection state between a connector part and the terminal part shown in FIG. 5.

FIG. 5 is a plan view illustrating a back surface of another portable terminal in which a battery pack is mounted according to the present invention, and FIG. 6 illustrates a connection state between a connector part and a terminal part shown in FIG. 5.

A structure of the present embodiment is mainly similar to the structure of FIG. 2. Thus, descriptions of a position for installing a connector part 104 on a battery pack mount part, a position for installing a nondirectional terminal 30 of a battery pack, etc. will be omitted. However, the connector part 104 provided on the battery pack mount part includes only a positive connector 108 and a negative connector 109. Most connector parts for supplying power may have such structures. In this case, the terminal part 30 of the battery pack includes a positive terminal 32 and a negative terminal 33. Alternatively, negative terminals 31 and 33 may be symmetrically installed based on the positive terminal 32 of the terminal part 30. Thus, even if the battery pack is mounted in a rotated or reversed state, the negative connector 109 may be connected to the negative terminal 31 at a position marked with dotted lines of FIG. 6. As a result, power may be smoothly supplied to the portable terminal.

In accordance with the present invention as described above, a battery pack can smoothly supply power even if the battery pack is mounted on a battery pack mount portion of an electronic device in a reversed or rotated state. Thus, use convenience can be increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A battery pack comprising at least one non-directional terminal part that is electrically connected to a connector part provided on a battery pack mounting surface of a body of an electronic device,
    wherein the terminal parts include a plurality of individual terminals which are respectively connected to individual connectors of the connector part and are symmetrically installed to constantly and smoothly supply power even if the battery pack is reversely mounted in the electronic device,
    wherein the individual terminals of the terminal part have concentric circles and approximately circular shapes having different sizes.

2. The battery pack of claim 1, wherein the connector part is installed at an intersection between central portions of widthwise and lengthwise directions of the battery pack mounting surface, and the terminal part of the battery pack may be installed in at least two positions corresponding to the connector part.

3. The battery pack of claim 2, wherein the individual terminals comprise a positive terminal or a negative terminal.

4. The battery pack of claim 3, wherein one of the positive and negative terminals of the terminal part is positioned in a center, and the other ones are positioned on right and left sides of the one terminal.

5. The battery pack of claim 4, wherein terminal parts are installed on oppositely facing surfaces of the battery pack.

6. The battery pack of claim 1, wherein the individual terminals comprise a positive terminal, a negative terminal, or a ground terminal.

7. The battery pack of claim 6, wherein terminal parts are installed on oppositely facing surfaces of the battery pack.

8. The battery pack of claim 1, wherein terminal parts are installed on oppositely facing surfaces of the battery pack.

9. A portable terminal comprising:
    a body;
    a battery pack attachably mounted on the body;
    a connector part installed on a battery pack mounting surface of the body; and
    at least one terminal part installed on the battery pack and electrically connected to the connector part,
    wherein the terminal part includes a plurality of individual terminals which are respectively connected to individual connectors of the connector part and are symmetrically installed to constantly and smoothly supply power even if the battery pack is reversely mounted in the electronic device, wherein the individual terminals of the terminal part have concentric circles and approximately circular shapes having different sizes.

10. The portable terminal of claim 9, wherein the connector part is installed at an intersection between central portions of widthwise and lengthwise directions of the battery pack mounting surface, and the at least one terminal part of the battery pack may be installed in at least two positions corresponding to the connector part.

11. The portable terminal of claim 10, wherein the individual terminals comprise a positive terminal or a negative terminal.

12. The portable terminal of claim 11, wherein one of the positive and negative terminals of the terminal part is positioned in a center, and the other ones are positioned on right and left sides of the one terminal.

13. The portable terminal of claim 12, wherein terminal parts are installed on oppositely facing surfaces of the battery pack.

14. The portable terminal of claim 10, wherein terminal parts are installed on oppositely facing surfaces of the battery pack.

15. The portable terminal of claim 9, wherein the individual terminals comprise a positive terminal, a negative terminal, or a ground terminal.

16. The portable terminal of claim 15, wherein terminal parts are installed on oppositely facing surfaces of the battery pack.

* * * * *